UNITED STATES PATENT OFFICE 2,422,278

LUBRICATING OIL COMPOSITION

David W. Young, Roselle, and John D. Calfee, Westfield, N. J., assignors to Standard Oil Development Company, a corporation of Delaware No Drawing. Application December 1, 1943, Serial No. 512,492

9 Claims. (Cl. 252—59)

This invention relates to lubricating oils, relates especially to means for improving the viscosity index of lubricants, and relates particularly to combinations of polymers of substituted pentadienes with auxiliary coreactants in solution in a hydrocarbon lubricant.

In the preparation of lubricants, particularly lubricating oils, it is desirable that the lubricant show as small a change in viscosity with change in temperature as possible; that is, it is desirable that lubricants should have as high a viscosity index as can be obtained. To the present, many additives have been offered for use in lubricants to improve the viscosity index, including such substances as polyisobutylene, the heat polymerization product of the ester of methacrylic acid and a monohydric saturated alcohol containing more than 4 carbon atoms, deproteinized rubber, and many others, of which the polyisobutylene has had the widest commercial use and has been found to be one of the more satisfactory, perhaps the most satisfactory, of the lubricant thickeners and viscosity index improvers. However, the viscosity improving agents all show the property of a "V. I. ceiling" and no amount of the substance added to a lubricating oil will improve the viscosity index beyond a specific limit, which is characteristic of each particular substance.

The present invention consists of a lubricant substance composed of a hydrocarbon lubricant containing dissolved therein a high molecular weight polymer of a substituted pentadiene, chemically combined with an auxiliary substance. The resulting lubricant is found to have a desirably high viscosity index ceiling and many other desirable properties such as a high solubilty of the polymer in light mineral oils, especially at low temperatures ranging from +10° to —60° C.; and high stability due to the fact that the coreaction product between the polypentadiene and the auxiliary substance produces a solute which is substantially free from chemical unsaturation, and, accordingly is not subject to the action of air or oxygen. This property permits of the maintenance of good color, maintenance of good solubility of the addition agent, maintenance of the molecular weight of the addition agent, and the like.

Thus, an object of the invention is to improve the viscosity and viscosity index of a lubricating oil by the addition to the lubricating oil of a polymer of a substituted pentadiene compounded with an auxiliary coreactant; such as poly methyl pentadiene, combined with maleic anhydride.

Other objects and details of the invention will be apparent from the following description:

The present invention is based upon the discovery that polymers of substituted pentadienes may be reacted with auxiliary substances such as maleic anhydride and remain soluble in lubricating oils; and exert, in such solutions, a potent thickening effect upon the lubricant to increase the viscosity, and, in addition show a very potent effect in improving the viscosity index, the material showing a V. I. ceiling from 7 to 10 points higher than is obtainable with the polybutene addition agent.

The solute in the lubricant of the present invention is a high molecular weight polymer of a polyolefin having two or more double linkages in a linear chain of more than four carbon atoms; an aliphatic side chain preferably upon the second carbon atom; and a double linkage between the first and second carbon atoms. Particularly useful for the preparation of the polymer is the 2 methyl pentadiene 1,3. This material is conveniently obtained by dehydration of 2-methyl-2,4-pentanediol. The reaction is conveniently indicated as follows:

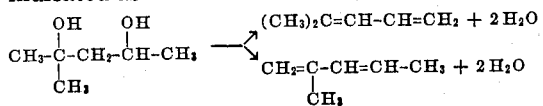

The principal products of this reaction are the desired 2-methyl pentadiene-1,3, and also the isomeric 2 methyl pentadiene 2,4, the latter product usually being present to the extent of approximately 30%. However, the presence of the isomer does not appear to be harmful and it probably interpolymerizes to some extent although this is not as yet definitely established. The physical properties of the resulting -diene mixture are as follows:

Boiling point °C. _____ [1] 75–77
Density _____ 0.7113
Refractive index $N_D^{20}$ _____ 1.4472

[1] 760 mm. Hg.

In the preparation of the polymer, the substituted pentadiene isomeric mixture is cooled to a temperature below about —20° C., preferably to a temperature between —40° C. and —100° C. or even as low as —164° C., either by the use of a refrigerating jacket upon a container for the polyolefin, or, alternatively, by the direct admixture with the polyolefin of such refrigerants as liquid or solid carbon dioxide, or liquid ethylene, or liquid ethane, or liquid methane, or the like. To the cold olefinic material there is then added a dissolved Friedel-Crafts catalyst such as aluminum chloride dissolved in ethyl chloride. The polymerization proceeds at good speed to yield the desired polymer. When a sufficient amount of the diolefin has polymerized into the desired product, the reaction mixture may be dumped into warm water or warm soda solution or other alkaline material to inactivate the catalyst and volatilize any residual olefinic material and refrigerant and to bring the polymer up to room temperature. The polymer may then be washed with further quantities of water as on the open mill, and then dried for further processing.

For the catalyst, any of the Friedel-Crafts catalysts disclosed by N. O. Calloway in his article on "Friedel-Crafts synthesis" printed in the issue of "Chemical Reviews" published for the American Chemical Society at Baltimore in 1935, in volume XVII, No. 3, the article beginning on page 327, the list being particularly well shown on page 375, may be used, according to the type of material to be polymerized, the temperature at which the polymerization is conducted and the molecular weight desired in the finished polymer. Among the more useful of these catalysts is boron trifluoride which may be used as a gas, bubbled through the cold reaction material, or dissolved in an appropriate solvent. Alternatively, others of the catalysts such as aluminum bromide, and titanium tetrachloride, have sufficiently low boiling or subliming temperatures to permit of the addition in vapor form to the reaction mixture. For catalyst solvent, substantially any of the low boiling alkyl halides may be used, whether they are mono or poly halides, provided their freezing point is below about 0° C., the essential requirement being a reasonably low freezing point and the lack of complex formation by the solvent with the Friedel-Crafts compound (as shown by volatilization of the solvent away from the solute, to leave only the solute as residue). The polymer of the substituted pentadiene may be used alone, as above described, or it may be polymerized in admixture with a considerable range of copolymerizates such as chlor maleic anhydride or styrene, or the like.

The resulting polymer may have a molecular weight within the range of 2,000 to 250,000, as determined by the Staudinger method. However, for the oil thickening work a polymer with a Staudinger molecular weight of about 8,000 to 25,000 is most desirable, as they have better stability under high rates of shear.

It may be noted also that the gaseous Friedel-Crafts type catalyst such as boron trifluoride or $AlBr_3$ as vapor gas are also usable either in solution, or merely bubbled through the cold reaction mixture.

The resulting polymer is then combined with an auxiliary coreactant which is preferably maleic anhydride, but may also be such substances as the liquid chlorinated maleic anhydride or the N substituted imides or sulfur dioxide or maleic anhydride with water or maleic anhydride with formic acid or styrene or chlorine or the like. The single coreactants may be used, as above indicated, or various mixtures of coreactants may be used such as chlorinated maleic anhydride and styrene, or the like. A desirable mixture is 4 mols of the polymethlypentadiene with ½ mol of chlorinated maleic anhydride and ½ mol of styrene. This is caused to interact by the presence of 0.8% of a catalyst such as benzoyl peroxide, and the reaction is desirably conducted at approximately 0° C.

The resulting coreacted polymer is then dissolved in a suitable lubricant which is preferably a light lubricating oil in which it is readily soluble and in which it imparts a very potent thickening action; and an extremely potent viscosity index improving action. It is desirable that the solvent oil have, of itself, as high a V. I. as possible, since the higher the V. I. of the base oil, the higher the V. I. of the solution containing the polymer.

However, the very high potency of the V. I. improving action permits of the preparation of useful lubricants of good V. I. from base oils which have viscosity indices at 0 or below. Thus, a high-grade paraffinic base oil with a V. I. of approximately 100 can be thickened and its V. I. improved to approximately 130 to 150 by the addition of an appropriate amount of the coreacted polymer of the present invention and a low V. I., low-grade oil with a V. I. between 0 and 20 can be improved to have a V. I. of approximately 100 to 120 by the addition of a proper amount of the coreacted polymer of the present invention.

Alternatively, the polymer is also useful in the solid oils or greases in which it also exerts a highly beneficial effect in maintaining the body of the grease over a variation in temperatures.

EXAMPLE 1

A polymer of 2 methyl pentadiene was prepared by mixing together 500 parts by volume of cold liquid 2-methyl pentadiene-1-3 with 2000 parts by volume of liquid ethylene yielding a temperature of approximately −100° C. The mixture was rapidly stirred, and a catalyst was sprayed in finely divided form onto the surface of the rapidly stirred mixture. This catalyst consisted of aluminum chloride in solution in methyl chloride in 0.478%, and approximately 50 parts by volume of the catalyst solution were added to the mixture of methyl pentadiene and ethylene in about 30 seconds. The polymerization began promptly and the yield was close to 100% by weight of the methyl pentadiene in the original mixture. The resulting polymer had a molecular weight of approximately 20,000 (as determined by the Staudinger Viscosity Method); and an iodine number (as determined by the Wijs method) of approximately 322.

This material was compounded according to the following recipe:

| | Parts |
|---|---|
| Polymer | 100 |
| Carbon black | 20 |
| Zinc oxide | 5 |
| Stearic acid | 5 |
| Sulphur | 3 |
| Tuads (tetra methyl thiuram disulfide) | 1 | and samples cured for 30 minutes at a temperature of 135° C. Tensile strength determinations showed that the material as so cured had a strength of 1400 to 2000 pounds per square inch with 400 to 1000% elongation at break, and a modulus at 300% elongation of about 400 lbs.

50 parts by weight of the poly methyl pentadiene were dissolved in 200 parts by weight of isopropyl benzene. To this solution there were then added 100 grams of pure maleic anhydride and about 2 grams of pure benzoyl peroxide as catalyst. The resulting mixture was heated to the boiling point of the materials for a period of four hours. The mixture was then cooled to room temperature and approximately 20 parts by weight of isopropyl alcohol was added. The alcohol precipitated from solution the compound formed between the polymer and the maleic anhydride; the alcohol insoluble recovered polymer material amounting to approximately 90 parts by weight yield. The polymer-maleic anhydride reaction product was then dissolved in toluene and water to hydrolyze the polymer-maleic anhydride reaction product to the acid salt type of substance.

The resulting acid salt type of polymer-addition product was then dried and dissolved in various percentages in several samples of a high grade mineral lubricating oil having a natural V. I. of 108 with a viscosity at 210° F. of 43 S. S. U. (this oil was "Barosa 43"). Three samples were prepared containing respectively 1%, 3% and 6% of the reacted polymer. Viscosity and viscosity index determinations were then made upon the resulting solutions, the measured values being shown in Table I:

TABLE I

*Barosa 43 oil and coreaction product of maleic anhydride with polymethylpentadiene*

| Per cent Polymer by Weight | Approx. M. W. of Polymer in Dimer | C. S. Vis. at 100° F. | C. S. Vis. at 210° F. | Saybolt Seconds at 210° F. | V. I. |
|---|---|---|---|---|---|
| 1 | 19,300 | 40.18 | 6.44 | 47.24 | 119.8 |
| 3 | 19,300 | 54.91 | 9.00 | 55.79 | 136.5 |
| 6 | 19,300 | 98.65 | 15.30 | 78.92 | 139.1 |

These results show the effectiveness of the co-reacted polymer as a viscosity improving agent.

EXAMPLE 2

50 parts by weight of polymethyl pentadiene having a molecular weight of approximately 18,000 and an iodine number of approximately 322, prepared as in Example 1, were dissolved in approximately 200 parts by weight of isopropyl benzene. To this solution there were then added approximately 25 parts by weight of maleic anhydride and 2 parts by weight of benzoyl peroxide. The material was then heated to the boiling point of the isopropyl benzene for six hours. At the end of this time the material was cooled to room temperature and the polymer was precipitated from the solution by the addition of approximately 20 parts by weight of dry isopropyl alcohol. The solid coreacted polymer was separated from the liquid and dried at a moderate temperature to remove as much as possible of the traces of isopropyl benzene, water and alcohol. The dry polymer in the amount of approximately 75 parts by weight was then dissolved in approximately 300 parts by weight of dry toluene at room temperature. The solution required approximately six hours at the end of which time a clear solution was obtained. To this clear solution of combined polymer and co-reactant in toluene solution there was then added approximately 65 parts by weight of formic acid (99% pure). As the acid was added, the solution temperature increased from 28° C. to 47° C. indicating reaction between the formic acid and the co-reacted polymer. The doubly co-reacted polymer was then precipitated from solution by the addition of approximately 20 parts by weight of dry isopropyl alcohol. This polymer was then dissolved in various percentages as before in a high grade mineral oil having a natural viscosity index of 108 (Barosa 43) and the viscosity and viscosity index were determined to yield the values shown in Table II.

TABLE II

| Per cent Polymer | Approx. M. W. of Polymer in Dimer | C. S. Vis. at 210° F. | Saybolt Seconds at 210° F. | V. I. |
|---|---|---|---|---|
| 3 | 14,300 | 11.2 | 63.46 | 140 |
| 6 | 14,300 | 16.9 | 85.30 | 143 |

These results show an excellent V. I. improving action.

EXAMPLE 3

The polymethylpentadiene was reacted with an imide prepared from lauryl amine and maleic anhydride (by the method shown in U. S. Patent 2,301,356); substantially according to the following equation:

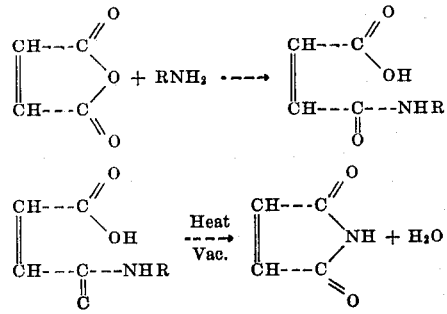

In which R is the lauryl radical. For this reaction, one part by weight of maleic anhydride and one part by weight of lauryl amine were mixed and heated together under high vacuum at 120° C. for 9 hours; a yield of approximately 67% by weight of the desired imide was obtained.

Approximately 50 parts by weight of polymethylpentadiene were dissolved in 250 parts by weight of isopropyl benzene and approximately 25 parts by weight of the lauryl imide were added, together with 1.7 parts by weight of benzoyl peroxide. The mixture was heated for approximately 12 hours at the boiling point of the solvent. The co-reacted polymer product was precipitated by the addition of approximately 20 parts by weight of isopropyl alcohol and the solid precipitated co-reacted polymer was separated from the liquid. The polymer was black in color.

The co-reacted product was then added in various proportions to a high grade oil having a V. I. of approximately 108 (Barosa 43) and viscosities and viscosity indices were determined to yield the values shown in Table III.

TABLE III

| Per cent Polymer | Approx. M. W. of Polymer in Dimer | C. S. Vis. at 100° F. | C. S. Vis. at 210° F. | Saybolt Seconds at 210° F. | V. I. |
|---|---|---|---|---|---|
| 1 | 9,300 | 44.59 | 7.16 | 49.57 | 126.5 |
| 3 | 9,300 | 67.94 | 10.33 | 60.35 | 132.6 |
| 6 | 9,300 | 177.15 | 22.90 | 100.6 | 132.3 |

These results further show the value of the co-reacted polymer as an addition agent to lubricating oils for improving the viscosity index.

EXAMPLE 4

Approximately 1000 parts by volume of 2-methyl pentadiene-1,3 having a boiling point between 75 and 77° C. was cooled to −103° C. by a jacket of liquid ethylene on a copper reactor. To this material there was then added 2000 parts by volume of pure liquid methyl chloride, and 300 parts by volume of C. P. styrene monomer. The styrene was purified by the procedure given in the Journal of the American Chemical Society, volume 63, No. 11 (November 1941), page 2954. To the cold mixture there was then added 300 parts by volume, at the rate of 100 parts per minute, of a solution of aluminum chloride in methyl chloride in the concentration of 0.7%. As the catalyst was added, the polymer precipitated out rapidly. When the catalyst had all been added and the polymerization was complete, the solid polymer was removed from the reaction mixture, washed with water and dried. This material was found to be a thermoplastic resin type of substance with a slightly yellow color, but clear and transparent. This copolymer was soluble in hydrocarbon lubricant grade oils, but saturation was reached at a lower percent of solute. The material was found to be adequately soluble in a high viscosity index lubricating oil such as "Barosa 43." (The "Barosa 43" had a S. S. U. viscosity at 210° F. of 43 and a viscosity index of 108). The polymer solution in Barosa 43 showed a very slight cloudiness at +10° C. Various percentages of the copolymer were included as solute in various samples of the "Barosa 43" and the viscosity and viscosity indexes of the several solutions were determined to yield test results shown in the following table:

| Per cent Copolymer | C. S. Vis. at 100° F. | C. S. Vis. at 210° F. | S. S. U. at 210° F. | V. I. |
|---|---|---|---|---|
| 1 | 42.08 | 7.04 | 49.17 | 131.3 |
| 3 | 69.95 | 10.0 | 59.21 | 126.1 |
| 6 | 147.8 | 18.8 | 93.12 | 129.8 |

Thus the composition of the present invention provides a new and useful thickened lubricating oil having a superior viscosity and superior viscosity index by the addition to a lubricating oil of a polymer of a substituted pentadiene co-reacted with an appropriate addition agent.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A lubricant comprising in combination a hydrocarbon oil and a dissolved viscosity index improving amount of a reaction product of polymerized methyl pentadiene having a molecular weight within the range between 8,000 and 25,000 in combination with maleic anhydride.

2. A lubricant comprising in combination a hydrocarbon oil and a dissolved viscosity index improving amount of a reaction product of polymerized 2-methyl pentadiene-1,3 having a molecular weight within the range between 8,000 and 25,000 in combination with maleic anhydride.

3. A lubricant comprising in combination a hydrocarbon oil and a dissolved viscosity index improving amount of a reaction product of polymerized 2-methyl pentadiene-1,3, having a molecular weight within the range between 8,000 and 25,000 in combination with a substituted maleic anhydride.

4. A lubricant comprising in combination a hydrocarbon oil and a dissolved viscosity index improving amount of a reaction product of polymerized 2-methyl pentadiene-1,3, having a molecular weight within the range between 8,000 and 25,000 in combination with a maleic anhydride and formic acid.

5. A process for producing a lubricant comprising the steps in combination of dissolving in a hydrocarbon oil a viscosity index improving amount of the alcohol insoluble product obtained by reacting polymerized 2-methyl pentadiene-1,3 with maleic anhydride in the presence of benzoyl peroxide, separating an alcohol insoluble product from the resultant mixture, reacting said insoluble product with formic acid and precipitating the reaction product with alcohol.

6. The process as defined in claim 5 wherein the polymerized 2-methyl pentadiene-1,3 has a Staudinger molecular weight of about 8,000 to 25,000.

7. A lubricant comprising in combination a hydrocarbon oil and a dissolved viscosity index improving amount of a reaction product of polymerized 2-methyl pentadiene-1,3 having a molecular weight within the range between 8,000 and 25,000 in combination with chlorinated maleic anhydride.

8. A lubricant comprising in combination a hydrocarbon oil and a dissolved viscosity index improving amount of a reaction product of polymerized methyl pentadiene having a molecular weight within the range between 8,000 and 25,000 in combination with a maleic anhydride capable of reacting therewith by addition to an olefinic linkage.

9. A lubricant comprising in combination a hydrocarbon oil and a dissolved viscosity index improving amount of a reaction product of polymerized methyl pentadiene having a molecular weight within the range between 8,000 and 25,000 in combination with a maleic anhydride capable of reacting therewith by addition to an olefinic linkage whereby a high molecular weight polar compound is formed.

DAVID W. YOUNG.
JOHN D. CALFEE.

REFERENCES CITED

The following references are of record in the file of this patent:

UNITED STATES PATENTS

| Number | Name | Date |
|---|---|---|
| 2,142,980 | Huijser | Jan. 3, 1939 |
| 2,274,749 | Smyers | Mar. 3, 1942 |
| 2,149,857 | Mikeska | Mar. 7, 1939 |

OTHER REFERENCES

J. Am. Chem. Soc. (vol. 64), p. 787–790, Apr. 1942. (Copy in Div. 50.)